(12) United States Patent
Ghannam et al.

(10) Patent No.: US 10,513,233 B1
(45) Date of Patent: Dec. 24, 2019

(54) HOUSING AND SHIELD FOR TRAILER-MOUNTED SENSORS

(71) Applicant: FORD GLOBAL TECHNOLOGIES, LLC, Dearborn, MI (US)

(72) Inventors: Mahmoud Y. Ghannam, Canton, MI (US); Sami Jarmak, Dearborn, MI (US); Roy Joseph Scott, Saline, MI (US); Kam Hage, Troy, MI (US); David J. Tippy, Ann Arbor, MI (US); Steven Y. Schondorf, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/127,297

(22) Filed: Sep. 11, 2018

(51) Int. Cl.
| | |
|---|---|
| *B60D 1/64* | (2006.01) |
| *B60R 16/023* | (2006.01) |
| *H01R 13/645* | (2006.01) |
| *B60D 1/36* | (2006.01) |
| *B60D 1/60* | (2006.01) |
| *G01D 11/24* | (2006.01) |

(52) U.S. Cl.
CPC .......... *B60R 16/0239* (2013.01); *B60D 1/363* (2013.01); *B60D 1/64* (2013.01); *H01R 13/6456* (2013.01); *B60D 1/605* (2013.01); *G01D 11/245* (2013.01)

(58) Field of Classification Search
CPC ................................................. B60R 16/0239

USPC ......................................................... 174/520
See application file for complete search history.

(56) References Cited

U.S. PATENT DOCUMENTS

| | | | |
|---|---|---|---|
| 5,761,046 A | 6/1998 | Hein et al. | |
| 5,951,035 A | 9/1999 | Phillips, Jr. et al. | |
| 7,341,264 B2 | 3/2008 | Swannie | |
| 8,353,521 B1 | 1/2013 | Seeley | |
| 8,540,527 B2 | 9/2013 | Puluc et al. | |
| 8,824,151 B2 | 9/2014 | Ghannam et al. | |
| 2007/0120701 A1* | 5/2007 | Teller .................. | E05B 73/0017 340/693.9 |
| 2016/0369940 A1 | 12/2016 | Patil et al. | |
| 2017/0028800 A1* | 2/2017 | Ghannam .............. | B60D 1/605 |
| 2017/0305215 A1 | 10/2017 | Scheips et al. | |

* cited by examiner

*Primary Examiner* — Stanley Tso
(74) *Attorney, Agent, or Firm* — Frank L. Lollo; MacMillan, Sobanski & Todd, LLC

(57) ABSTRACT

A shield housing mounts a yaw sensor onto a trailer structural element. A shield body defines a sensor cavity within a closed bottom, an open face, and a perimeter wall with a side opening. A mounting post extends from the closed bottom into the sensor cavity and is adapted to affix the sensor at a predetermined orientation in the shield body. A pair of side wings extend laterally from the perimeter wall. Each side wing has a respective groove adapted to retain a respective strap loop tensioned over the groove and the structural element. In one preferred embodiment, the perimeter wall may have a base edge, and the side wings may each have a base surface opposite the grooves. The base edge and the base surfaces may have a contoured profile configured to orient the housing in a predetermined direction on the structural element.

14 Claims, 8 Drawing Sheets

HOUSING AND SHIELD FOR TRAILER-MOUNTED SENSORS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to sensors for trailer towing with road vehicles, and, more specifically, to mounting of sensors for driver assist systems onto a trailer.

Trailers for towing by car and trucks are known having many different structural designs and using many different types of hitch receivers, hitches, and couplers (e.g., ball couplers, frame-mount hitches, fifth wheels, goosenecks, etc.). Electrical connections between the towing vehicle and the trailer are usually required for proper lighting of the trailer and are also commonly employed for other features such as braking. The associated wiring cables are tethered between the vehicle and trailer as known in the art.

To support driver assistance systems such as stability control systems, motion sensors such as a yaw sensor can also be mounted to a trailer. For example, U.S. patent application publication 2017/0028800A1 discloses a trailer with a yaw sensing apparatus including a yaw sensor housing and a docking station. Since driver assistance systems and the particular sensors for which they are designed are typically unique to the vehicle manufacturer, the placement of a yaw sensor on a trailer often an aftermarket effort (i.e., installed by an end user). A yaw sensor, in particular, has a need for mounting in a predetermined orientation to ensure it can detect the intended movements. Other sensors that could be mounted to a trailer, such as angular or linear motion sensors for detecting acceleration along an x, y, or z axis, would also depend on being placed it a particular orientation. Oftentimes, the sensor installation may only be temporary, as in the case of renting or borrowing a trailer.

During use on the trailer, it is desirable to protect the sensor from gravel impingement, mud, ice, and other environmental conditions. Traditional methods of attaching sensors on the trailer such as screws or bolts passing through a portion of the trailer frame may be undesirable from a user standpoint because they require drilling or other modifications of the trailer and may be difficult to successfully achieve a precise sensor alignment that may be required. Therefore, it would be desirable to provide a simple and effective manner of installing and removing a sensor on a trailer which achieves proper alignment and environmental protection without depending upon special expertise by the user.

SUMMARY OF THE INVENTION

The invention utilizes a molded or stamped housing having a center sensor cavity to hold the sensor in a predetermined orientation and to protect the sensor from environmental conditions. The housing has two side wings, each with a special geometry including a contoured bottom surface for gripping and interfacing with a trailer post and an upper channel with a raised edge to contain temporary attachment straps, wherein each side wing also includes a fastener hole to provide a more permanent attachment to the trailer post if desired. In internal fastener is provided in the housing to hold the sensor in place. The walls of the housing may include multiple ribs and other reinforcements to obtain the required strength and durability using various economical materials. External features on the housing indicate an appropriate reference direction to assist in mounting with a proper alignment. A side opening in the housing conveys a sensor cable for external connection while maintaining sufficient environmental protection of the sensor.

In one aspect of the invention, a shield housing is provided for mounting a sensor to a trailer structural element. A shield body defines a sensor cavity within a closed bottom, an open face, and a perimeter wall with a side opening. A mounting post extends from the closed bottom into the sensor cavity and is adapted to affix the sensor at a predetermined orientation in the shield body. A pair of side wings extend laterally from the perimeter wall. Each side wing has a respective groove adapted to retain a respective strap loop tensioned over the groove and the structural element. In one preferred embodiment, the perimeter wall may have a base edge, and the side wings may each have a base surface opposite the grooves. The base edge and the base surfaces may have a contoured profile configured to orient the housing in a predetermined direction on the structural element. The predetermined orientation and the predetermined direction may be configured to assure that the sensor is mounted at a predetermined spatial alignment.

DETAILED DESCRIPTION OF PREFERRED EMBODIMENTS

Figure 1:
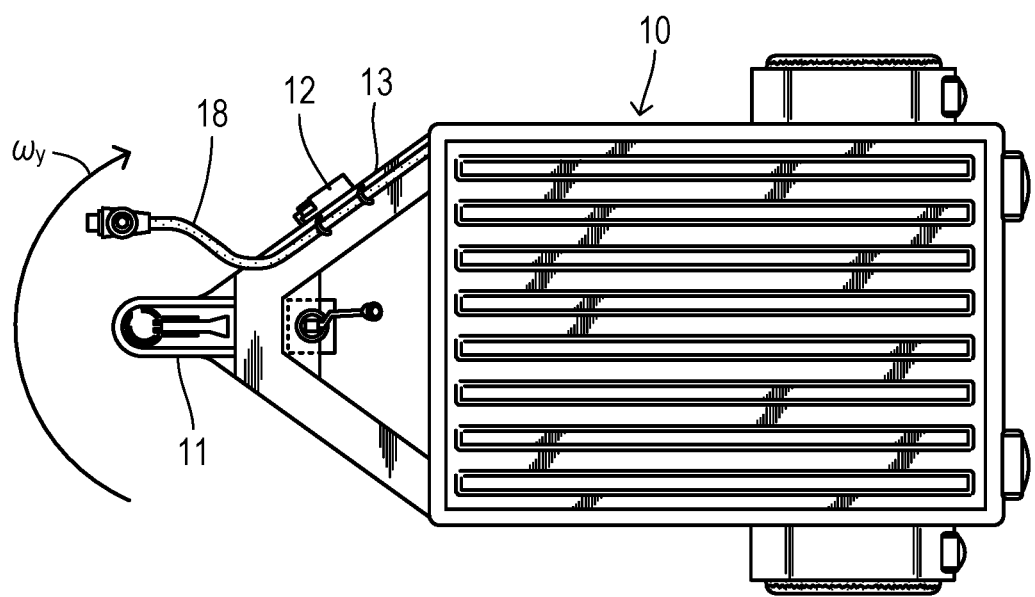
FIG. 1 is a top view of a trailer.
Figure 2:
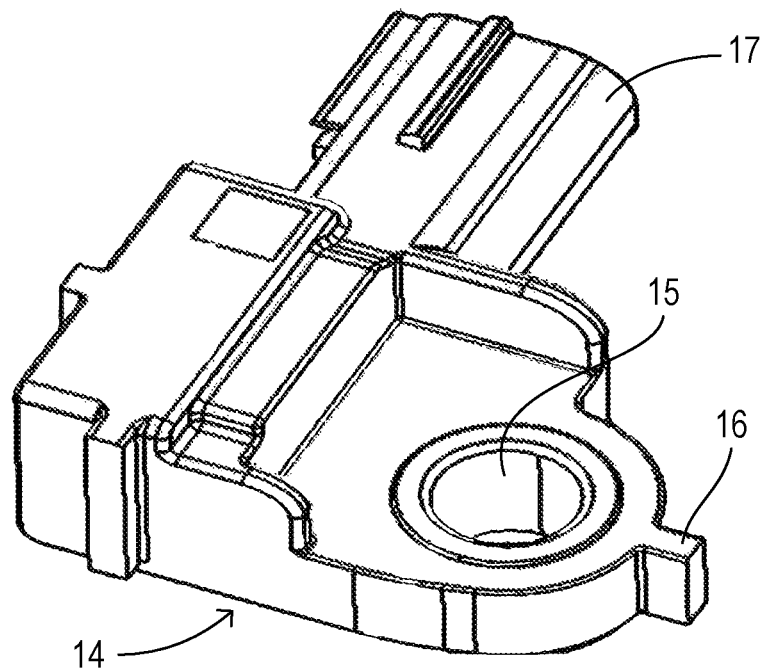
FIG. 2 is a perspective view of a sensor to be mounted on a trailer.

FIG. 1 shows a trailer 10 with a coupler 11 adapted to connect to a mating coupler on a towing vehicle (not shown). A housing 12 is mounted on a frame element 13 of trailer 10 to contain a yaw or other motion sensor. For example, a yaw sensor in housing 12 may be oriented for detecting a yaw rate, $\omega_y$, of trailer 10 (i.e., pivotal movement about a vertical axis through coupler 11). Sensor 14 in FIG. 2 is an example of a yaw sensor with a mounting hole 15 and an index feature 16 which may be used to ensure a desired orientation when mounting of sensor 14. An electrical connector 17 interfaces with a wiring element such as a pigtail connector for interconnecting to the electrical system of a towing vehicle (not shown). A wiring cable between the sensor and the vehicle may be in addition to a wiring harness 18 shown in FIG. 1 for interconnecting with trailer lights and other trailer components.

Figure 3:
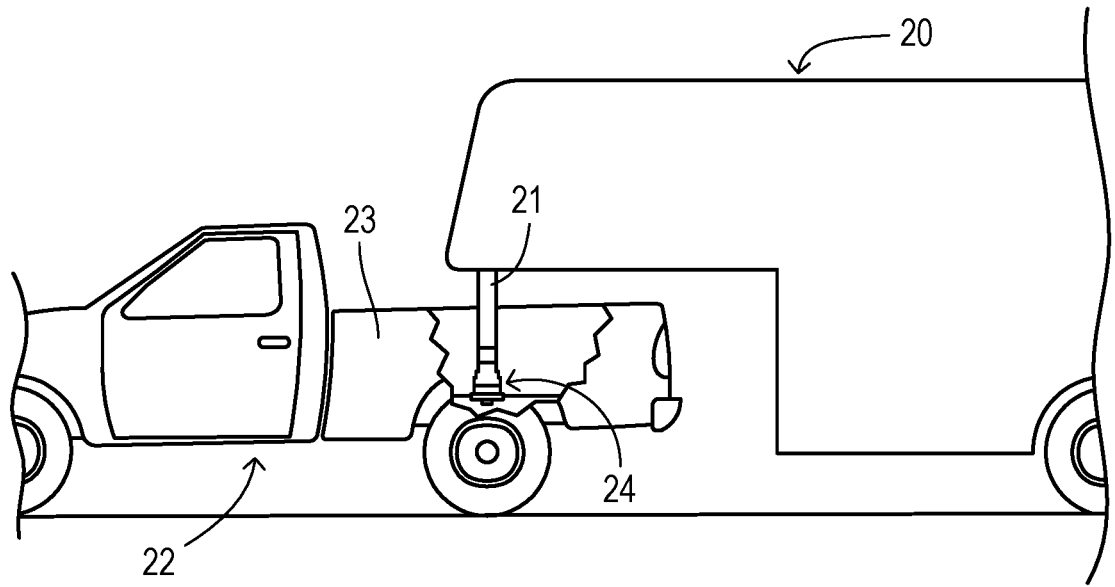
FIG. 3 is a side view of a gooseneck trailer mounting system between a truck and a trailer.

In many embodiments, a trailer portion of the hitch coupling may include a vertical post, thereby providing a most convenient location for mounting a sensor. As shown in FIG. 3, a trailer 20 has a vertical post or king pin 21 for coupling to a towing vehicle (e.g., pick-up truck) 22. A side 23 of vehicle 22 is partially broken away to reveal a coupling 24 for attaching post 21 to vehicle 22.

Figure 4:
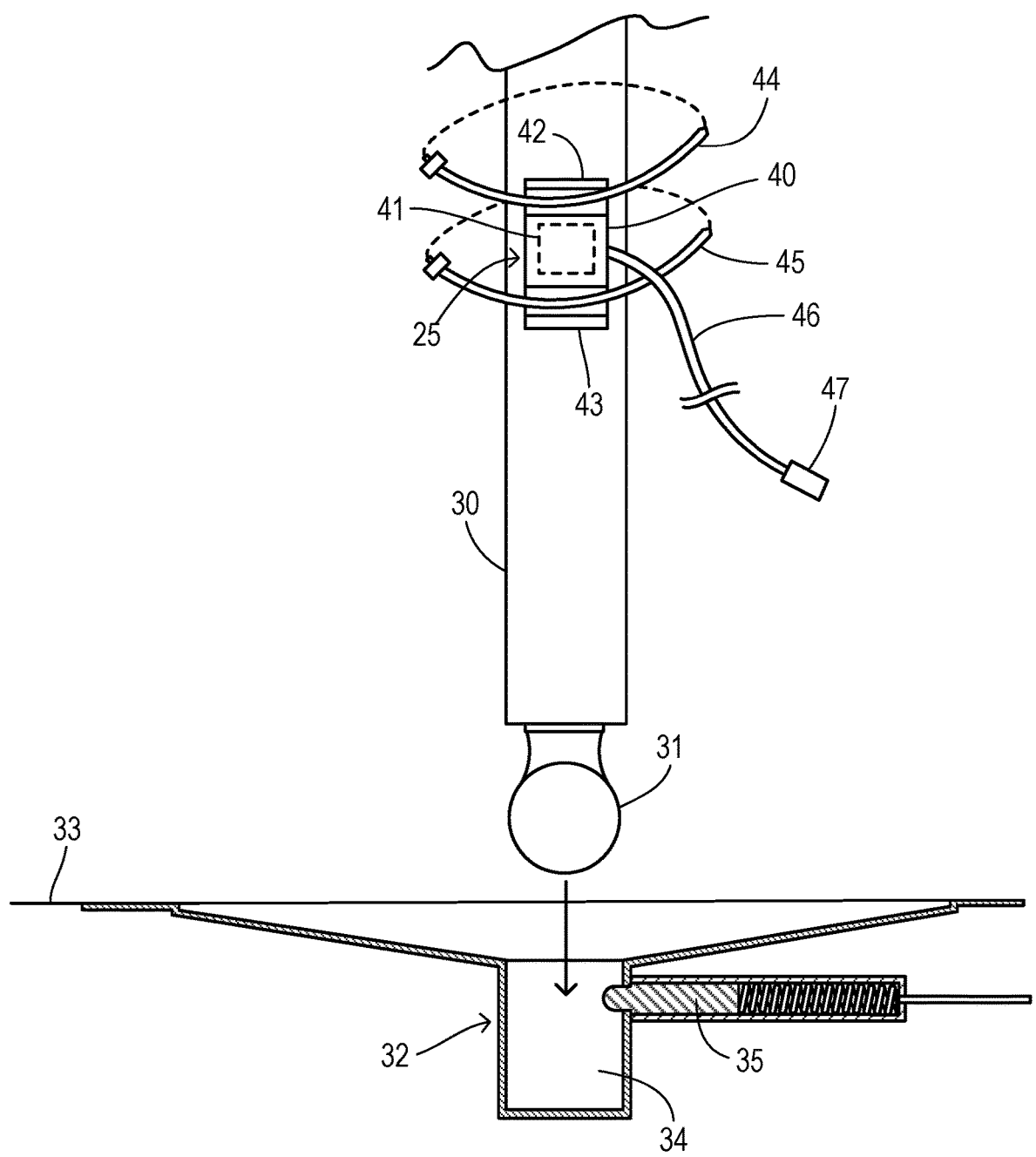
FIG. 4 is a side view showing a hitch system in greater detail with a vertical trailer post receiving a sensor and housing according to one embodiment of the invention.
Figure 6:
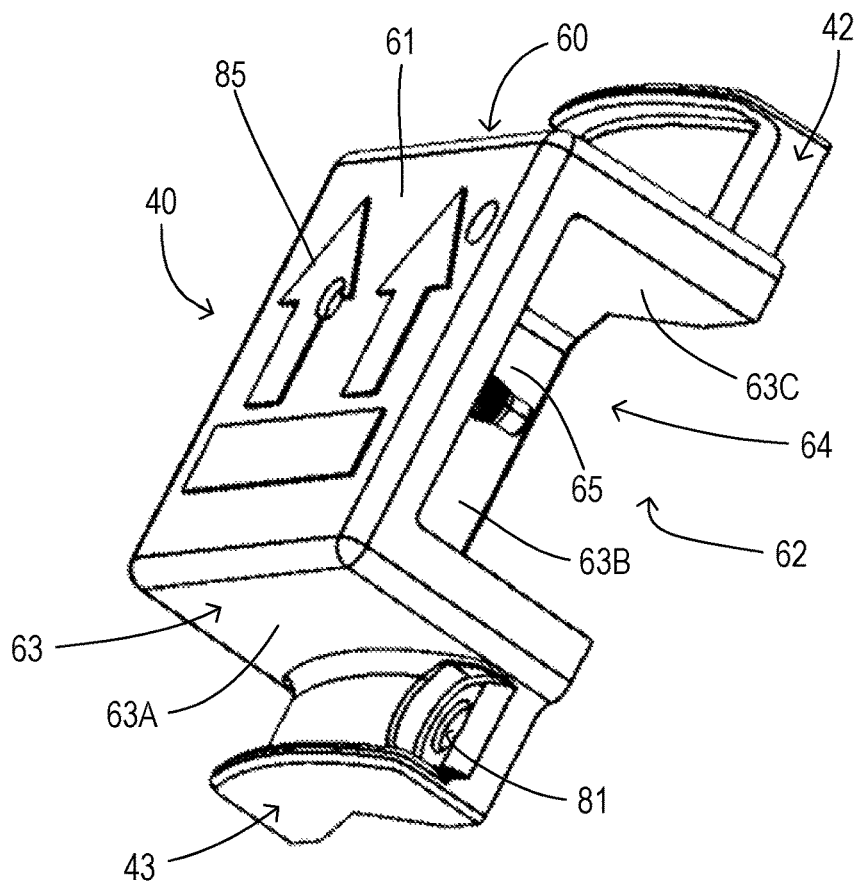
FIGS. 6 and 7 are side perspective views showing a side opening for one preferred embodiment of a shield/housing of the invention.
Figure 7:
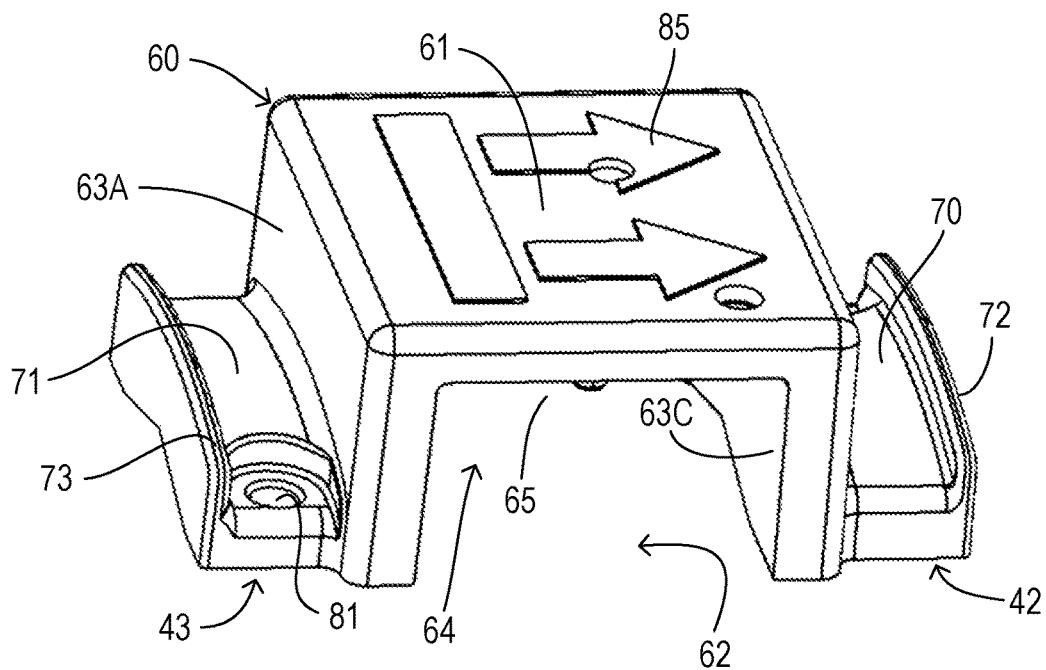

As shown in FIG. 4, a sensor system 25 located close to the vertical axis of the yaw motion (i.e., the axis of side-to-side pivoting of the trailer mount) provides a simple and convenient temporary mounting solution while ensuring a desired sensor orientation. A vertical post 30 has a ball end 31 adapted to be received by a coupling mechanism 32 mounted on a truck bed 33. Ball end 31 is received in a socket 34, and may be locked in place using a latch pin 35 as known in the art. Sensor system 25 has a housing 40 containing a sensor 41. Housing 40 has side wings 42 and 43 with prospective grooves adapted to retain respective strap loops 44 and 45 which are tensioned over the grooves and post 30 to retain sensor system 25 at a desired position and orientation. Straps 44 and 45 may be comprised of cable ties (i.e., zip ties). A typical cable tie may have a ribbed nylon strap that is ratcheted through a head end with a pawl or tooth that prevents reverse movement of the strap to lock it in place and maintain tension in the loop. An electrical cable 46 extends from sensor 41 and is conveyed through a side opening of housing 40. An end terminal 47 of cable 46 connects to a vehicle wiring harness (not shown).

Figure 5:
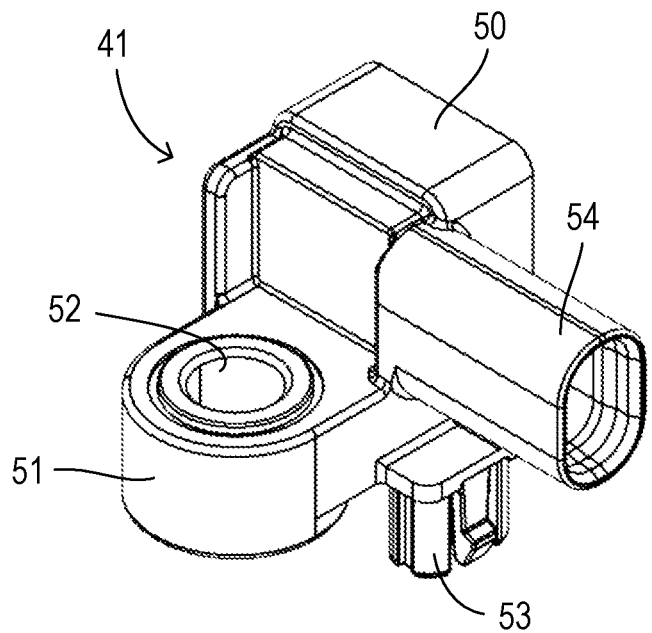
FIG. 5 is a perspective view of another sensor adapted for mounting in a housing of the invention, wherein the sensor includes a keying feature for restricting the orientation at which the sensor can be mounted in the housing.

An illustrative embodiment of a sensor 41 is shown in FIG. 5 wherein a sensor housing includes a sensor compartment 50 (e.g., containing electronic components such as piezoelectric elements for measuring slip angle in a yaw sensor). A mounting flange 51 includes a mounting aperture 52 for receiving a fastener such as a screw or bolt. A keying feature 53 extends from sensor 41 spaced away from flange 51 to mate with a keying feature of the shield housing to ensure that sensor 41 is affixed at a predetermined orientation in the shield housing. As shown, keying feature 53 may be comprised of a bar extending parallel to aperture 52. A connector housing 54 extends perpendicularly to aperture 52 so that a cable connection can be made facing toward an open side of the shield housing as described below.

Shield housing 40 is shown in greater detail in FIGS. 6-9. Housing 40 may preferably be comprised of a molded plastic structure. Housing 40 has a shield body 60 with a closed bottom 61, an open face 62, and a perimeter wall 63. In the illustrated embodiment, shield body 60 is generally box-shaped with perimeter wall 63 having solid sides 63A, 63B, and 63C. A side opening 64 is formed by a gap in perimeter wall 63. Bottom 61 and wall 63 define a sensor cavity 65. A mounting post 66 (FIGS. 8 and 9) extends from closed bottom 61 into sensor cavity 65 and is adapted to affix the sensor at a predetermined orientation in shield body 60. Mounting post 66 may preferably be comprised of a threaded shank with an end which is insert molded into closed bottom 61 of shield body 60. Post 66 preferably extends from closed bottom 61 within a sensor recess 67 which includes a keying feature 68 configured to receive keying feature 53 on yaw sensor 41. The predetermined orientation of sensor 41 places an attachment point between the sensor and an electrical cable (e.g., the connector terminal of the sensor) proximate to side opening 64. Side opening 64 is oriented to a horizontal side of housing 40 so that water, snow, or debris do not become trapped within sensor cavity 64.

Mounting post 66 is preferably comprised of a metal bolt with its head insert molded into shield body 60. Shield body 60 and side wings 42 and 43 are preferably all molded as a unitary body. The unitary body is preferably molded to includes a plurality of ribs and internal voids within perimeter wall 63 and side wings 42 and 43. The ribs and voids are configured to reinforce a molded shape of the unitary body.

Side wings 42 and 43 extend laterally from opposing sides of perimeter wall 63, each having a respective groove 70 and 71 adapted to retain a respective strap loop tensioned over the groove and a structural element of the trailer (e.g., a vertical post or a frame member). Preferably, grooves 70 and 71 have upstanding side rails 72 and 73. Grooves 70 and 71 are shaped to form a concentric ring surface forming a bottom of each groove between the respective perimeter wall and respective side rails 72 and 73. The curving ring surfaces facilitate the placement and tightening of the strap loops.

If a more permanent installation is desired than what is provided using the strap loops, a plurality of molded through-holes are formed in housing 40 adapted to receive permanent fasteners for attaching the housing to the trailer structural element. For example, side wings 42 and 43 have respective through-holes 80 and 81 configured to receive conventional fasteners such as a screw.

Figure 8:
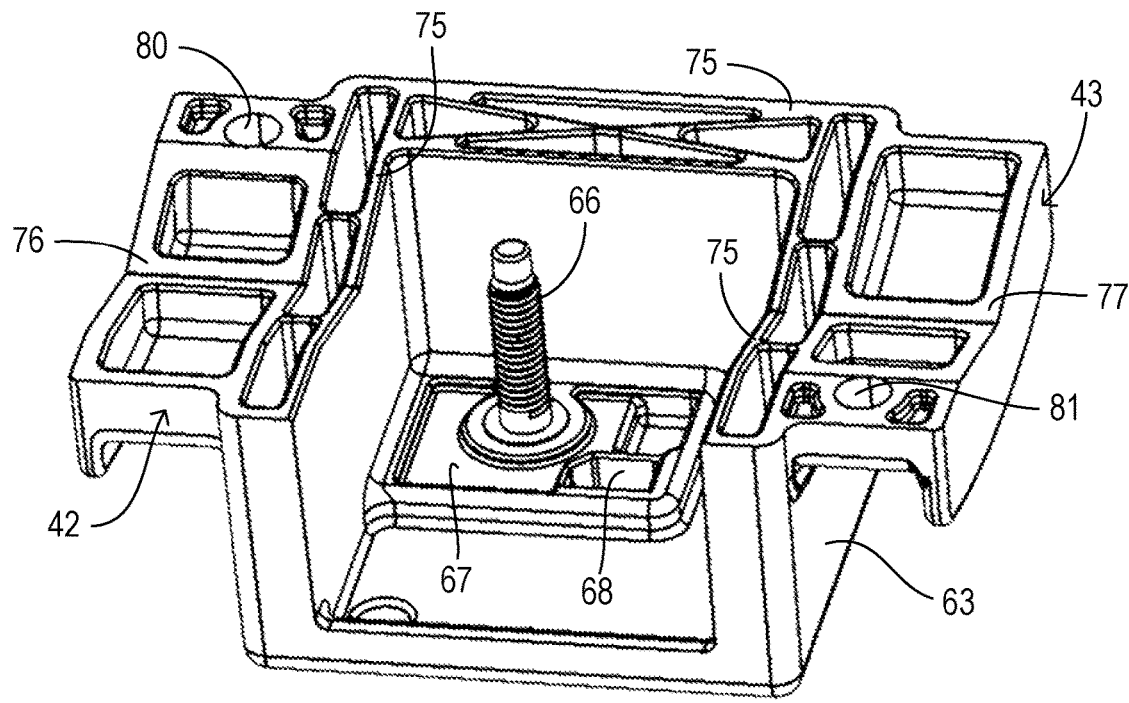
FIG. 8 is a bottom, perspective view of the housing of FIG. 6.
Figure 9:
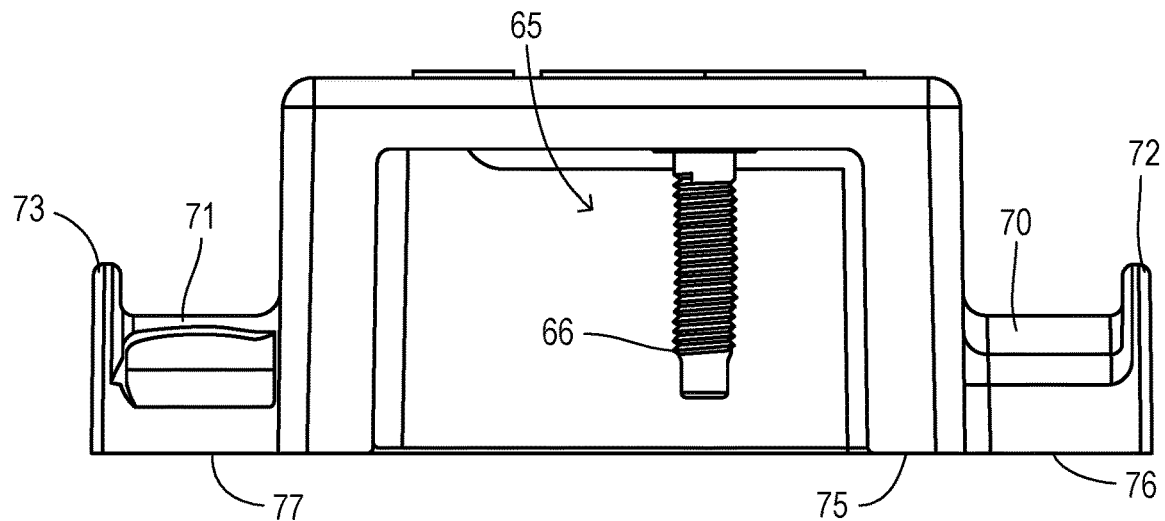
FIG. 9 is a side view of the housing of FIG. 6.

As best seen in FIG. 8, perimeter wall has a base edge 75 and side wings 42 and 43 have base surfaces 76 and 77 opposite the grooves. Base edge 75 and base surfaces 76 and 77 have a contoured profile configured to orient housing 40 in a predetermined direction on the structural element, such that the predetermined orientation of the sensor within the cavity and the predetermined direction of mounting housing 40 on the structural element (e.g., vertical trailer post) are configured to assure that the sensor is mounted at a predetermined spatial alignment (e.g., an alignment which makes a yaw sensor respond to changes in the slip angle of the trailer about the hitch attachment). In the illustrated embodiment, the contoured profile is comprised of a V-shaped indentation extending longitudinally between side wings 42 and 43 creating a channel to receive a structural element of the trailer. The V-shaped profile automatically seats housing 40 onto the structural element such that the V-shaped profile extends parallel to a longitudinal axis of the structural element, especially when the structural element is a round (i.e., cylindrical) post. The V-shape profile can also be used to align housing 40 along a longitudinal corner of a rectangular structural element (e.g., a trailer frame rail). A C-shaped profile can also be used to orient housing 40 parallel to a longitudinal axis of a rectangular frame rail, provided an inner diameter of the C-profile is larger than a width of the structural element.

Figure 10:
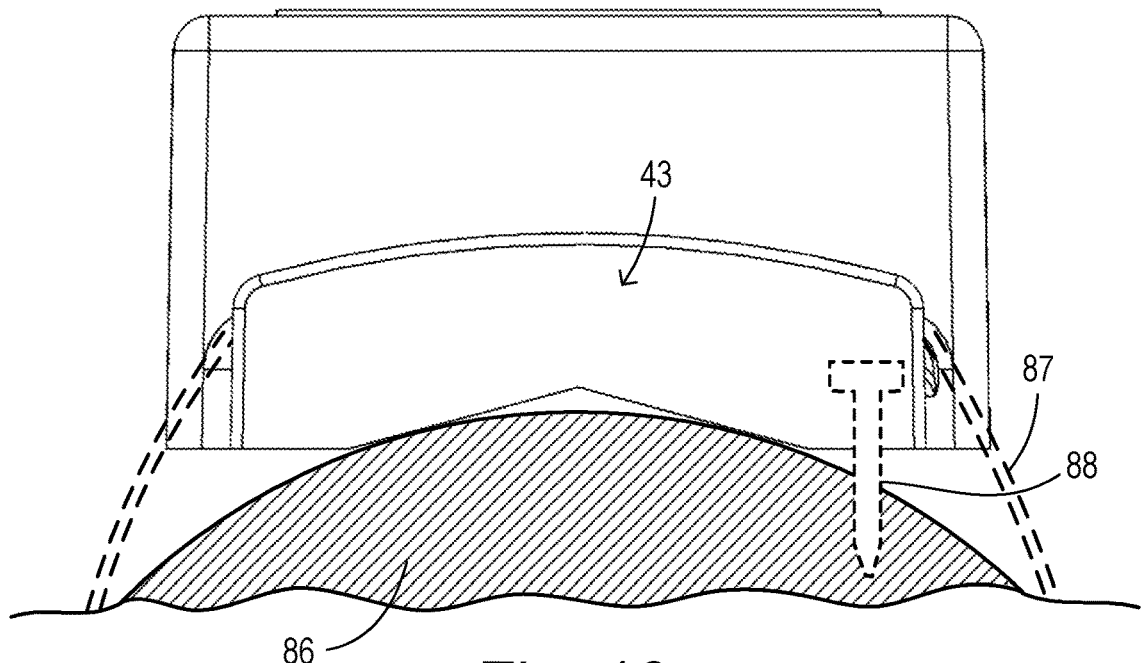
FIG. 10 is a diagrammatic view showing both temporary and permanent fasteners attaching the housing to a trailer structural element.
Figure 12:
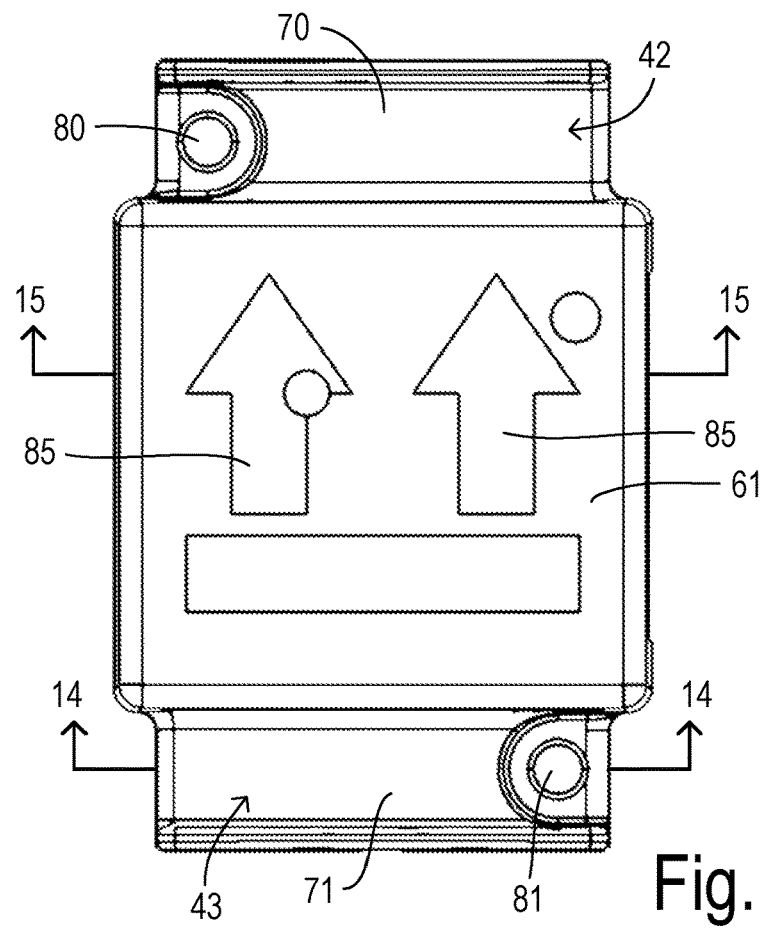
FIG. 12 is a top view of the housing of FIG. 6.

FIG. 10 shows a vertical trailer post 86 in a horizontal cross section. The round edge of post 86 fits within the V-shape profile formed in the base surfaces of the side wings and the base edge of the perimeter walls when housing 40 is pressed against post 86. For a relatively temporary installation, a strap loop 87 is tensioned over groove 71 in side wing 43 and around post 86. For a less temporary installation, a screw 88 is inserted in through-hole 81 and into post 86 (e.g., after an appropriately sized hole has been drilled into post 86 at the corresponding location).

Figure 11:
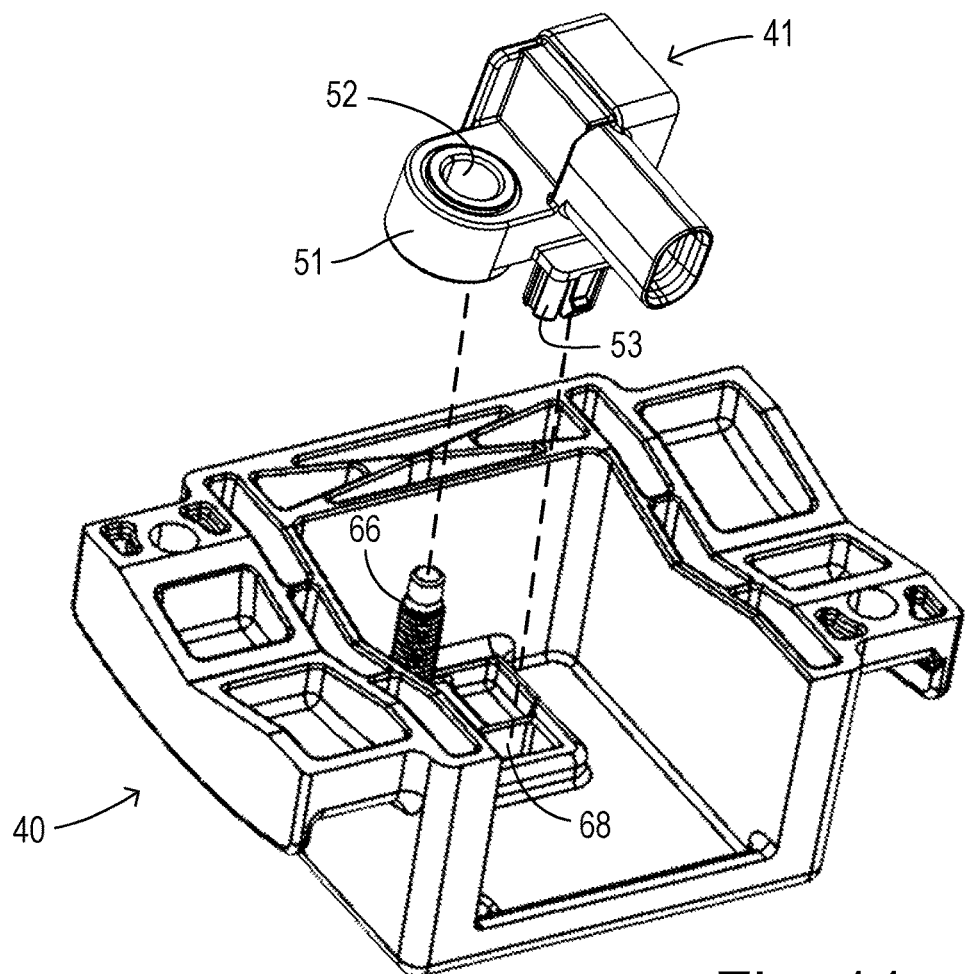
FIG. 11 is an exploded, perspective view of a sensor and shield/housing of the invention.
Figure 13:
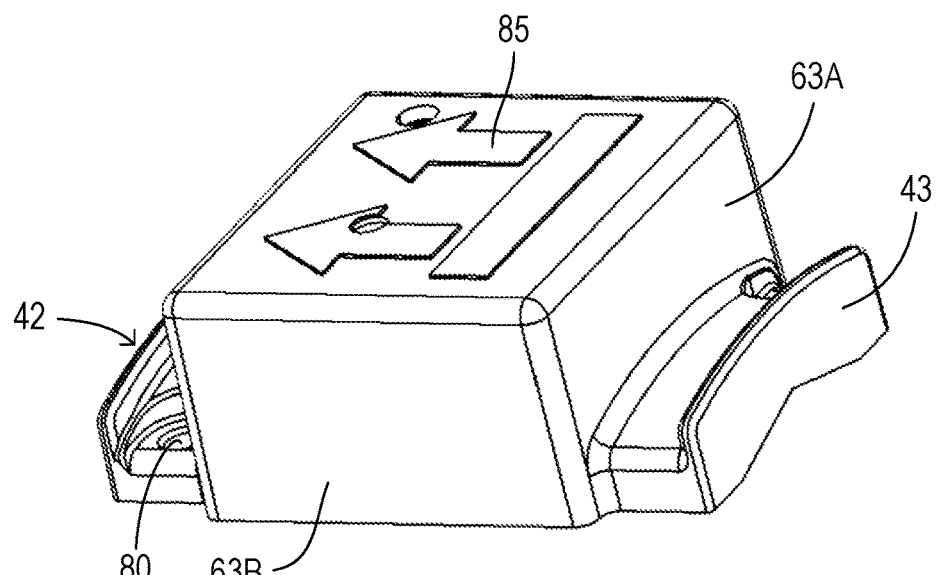
FIG. 13 is a top, perspective view of the housing of FIG. 6.

FIG. 11 is an exploded view showing the installation of sensor 41 into housing 40. Sensor 41 is placed so that hole 52 receives mounting post 66 and keying feature (bar) 53 is seated in keying feature (socket) 68. A nut (not shown) is threaded onto mounting post 66 to affix sensor 41 and keep it in the desired orientation. Once sensor 41 is attached, housing 41 is mounted to a trailer such that housing 41 is oriented in a predetermined direction, thereby ensuring that sensor 41 has the desired final orientation. To assist a user in properly orienting the housing, an external surface of closed bottom 61 may include raised graphic 85 (e.g., FIG. 13). For example, raised arrows are configured to point vertically upward when installed in the proper direction. The V-shape profile of housing 41 helps obtain a precise orientation.

Figure 14:
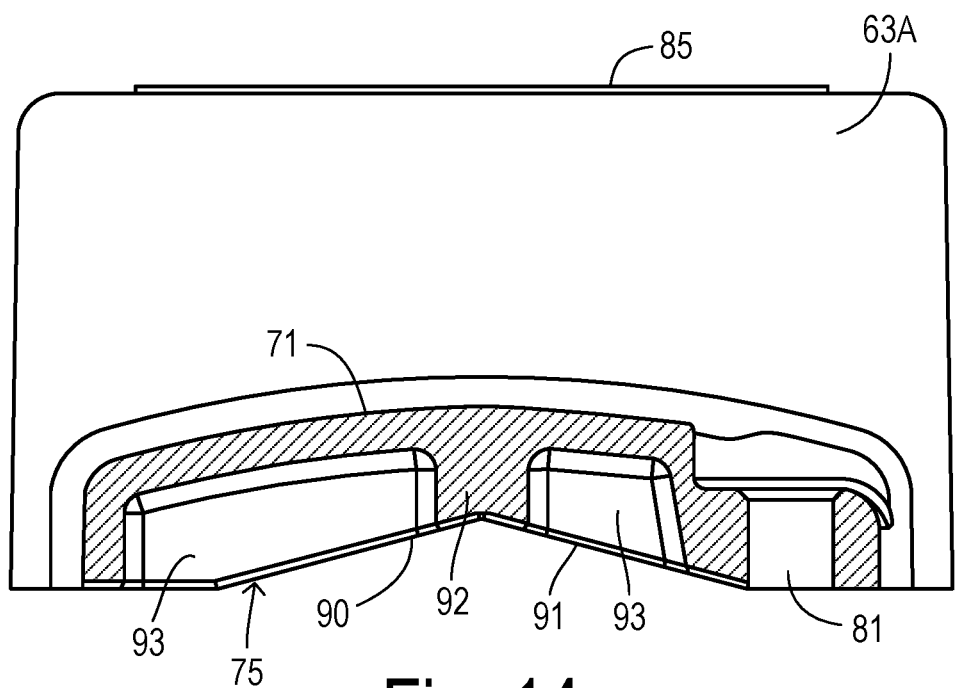
FIG. 14 is a side, cross-sectional view of the housing along line 14-14 shown in FIG. 12.

FIG. 14 shows a cross section through side wing 43 to reveal a curved ring surface of groove 71. The V-shape profile of base edge 75 is obtained by sloped sides 90 and 91. The cross section also shows internal rib 92 and voids 93, as commonly used to reinforce molded thermoplastic structures.

Figure 15:
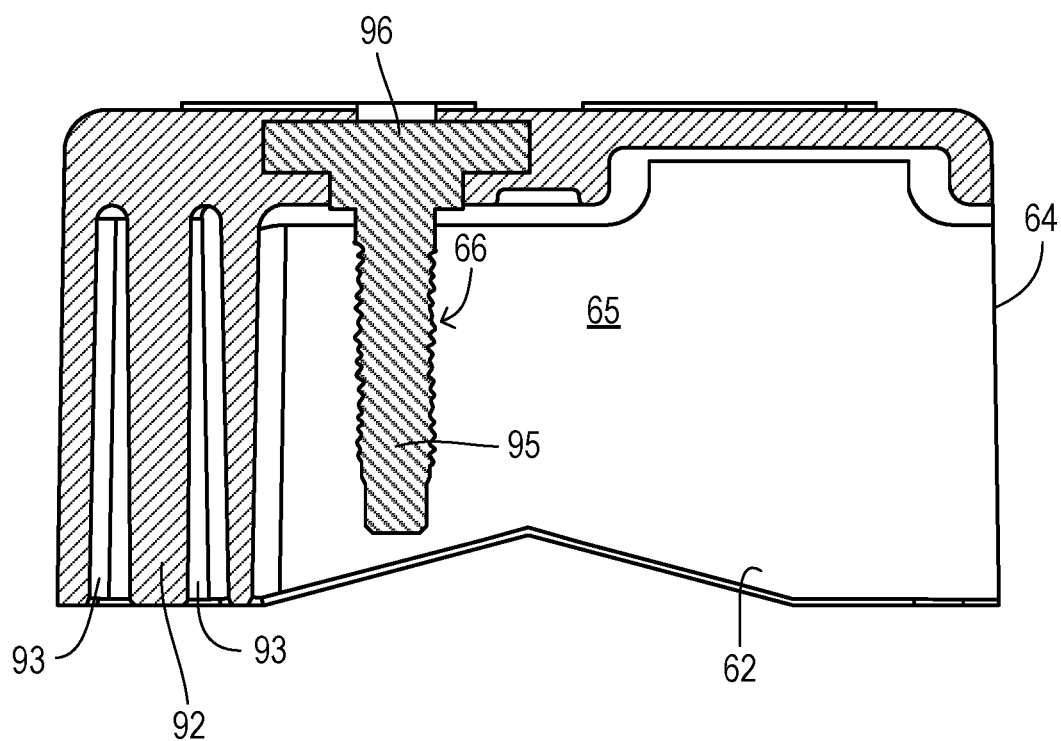
FIG. 15 is a side, cross-sectional view of the housing along line 15-15 shown in FIG. 12.

FIG. 15 shows a cross section through shield body 60 to reveal sensor cavity 65. Furthermore, mounting post 66 is seen with a threaded shank 95 and a head portion 96 which is insert molded into body 60. Perimeter wall 63 is reinforced by an internal rib 92 as a result of the formation of voids 93.

What is claimed is:

1. A housing for mounting a sensor to a trailer structural element, comprising:
   a shield body defining a sensor cavity within a closed bottom, an open face, and a perimeter wall with a side opening;
   a mounting post extending from the closed bottom into the sensor cavity adapted to affix the sensor at a predetermined orientation in the shield body; and
   a pair of side wings extending laterally from the perimeter wall, each having a respective groove adapted to retain a respective strap loop tensioned over the groove and the structural element;
   wherein the perimeter wall has a base edge, wherein the side wings each has a base surface opposite the grooves,
   and wherein the base edge and the base surfaces have a contoured profile configured to orient the housing in a predetermined direction on the structural element,
   wherein the predetermined orientation and the predetermined direction are configured to assure that the sensor is mounted at a predetermined spatial alignment;
   wherein the contoured profile is comprised of a V-shape configured to automatically seat the housing on the structural element with the V-shaped profile extending parallel to a longitudinal axis of the structural element when the structural element is comprised of a round post; and
   wherein the side opening is configured to convey a cable extending between the sensor and a vehicle towing the trailer,
   wherein the closed bottom includes a keying feature matched to the sensor for ensuring that the sensor is affixed in the predetermined orientation,
   and wherein the predetermined orientation places an attachment point between the cable and sensor proximate to the side opening.

2. The housing of claim 1 wherein the closed bottom includes a keying feature matched to the sensor for ensuring that the sensor is affixed in the predetermined orientation.

3. The housing of claim 1 wherein each groove is comprised of a side rail and a concentric ring surface forming a bottom of each groove between the respective perimeter wall and the respective side rail.

4. The housing of claim 1 wherein the shield body and the side wings are comprised of an integrally molded unitary body.

5. The housing of claim 4 wherein the mounting post is comprised of a metal bolt with a head and a shank, and wherein the head is insert molded into the unitary body.

6. The housing of claim 4 wherein the unitary body includes a plurality of ribs and internal voids configured to reinforce a molded shape of the unitary body.

7. The housing of claim 1 further comprising a plurality of molded through-holes adapted to receive permanent fasteners for attaching the housing to the structural element.

8. The housing of claim 7 wherein at least one through-hole is formed in each side wing.

9. A sensor system for a trailer towed by a vehicle, comprising:
   a yaw sensor for detect yaw movement of the trailer; and
   a housing for mounting a sensor to a trailer structural element, comprising:
      a shield body defining a sensor cavity within a closed bottom,
      an open face, and a perimeter wall with a side opening, wherein
      the side opening is configured to convey a cable extending between the sensor and the vehicle;
      a mounting post extending from the closed bottom into the sensor cavity adapted to affix the sensor at a predetermined orientation in the shield body; and
      a pair of side wings extending laterally from the perimeter wall,
      each having a respective groove adapted to retain a respective strap loop tensioned over the groove and the structural element;
      wherein the perimeter wall has a base edge, wherein the side wings each has a base surface opposite the grooves,
      and wherein the base edge and the base surfaces have a contoured profile configured to orient the housing in a predetermined direction on the structural element,
      wherein the predetermined orientation and the predetermined direction are configured to assure that the sensor is mounted at a predetermined spatial alignment;
      wherein the contoured profile is comprised of a V-shape configured to automatically seat the housing on the structural element with the V-shaped profile extending parallel to a longitudinal axis of the structural element when the structural element is comprised of a round post; and
      wherein the closed bottom includes a keying feature matched to the sensor for ensuring that the sensor is affixed in the predetermined orientation.

10. The sensor system of claim 9 wherein each groove is comprised of a side rail and a concentric ring surface forming a bottom of each groove between the respective perimeter wall and the respective side rail in order to retain the straps in the grooves.

11. The sensor system of claim 9 wherein the shield body and the side wings are comprised of an integrally molded unitary body, wherein the mounting post is comprised of a metal bolt with a head and a shank, and wherein the head is insert molded into the unitary body.

12. The sensor system of claim 11 wherein the unitary body includes a plurality of ribs and internal voids configured to reinforce a molded shape of the unitary body.

13. The sensor system of claim 11 further comprising a plurality of molded through-holes adapted to receive permanent fasteners for attaching the housing to the structural element.

14. A sensor housing for mounting a sensor to a towing trailer, comprising:

- a shield body with a closed bottom, an open face, and a perimeter wall with a side opening;
- a mounting post extending from the closed bottom to affix a yaw sensor at a predetermined orientation against the closed bottom; and
- two side wings extending laterally oppositely from the perimeter wall, each defining a groove adapted to retain a tension strap over the groove and the trailer;
- wherein the perimeter wall has a base edge, wherein the side wings each has a base surface opposite the grooves,
- and wherein the base edge and the base surfaces have a contoured profile configured to orient the housing in a predetermined direction on the towing trailer,
- wherein the predetermined orientation and the predetermined direction are configured to assure that the sensor is mounted at a predetermined spatial alignment;
- wherein the contoured profile is comprised of a V-shape configured to automatically seat the housing on the towing trailer with the V-shaped profile extending parallel to a longitudinal axis of the towing trailer when the towing trailer is comprised of a round post; and
- wherein the side opening is configured to convey a cable extending between the sensor and a vehicle towing the trailer,
- wherein the closed bottom includes a keying feature matched to the sensor for ensuring that the sensor is affixed in the predetermined orientation,
- and wherein the predetermined orientation places an attachment point between the cable and sensor proximate to the side opening.

* * * * *